(12) United States Patent
Rausa et al.

(10) Patent No.: US 7,763,681 B2
(45) Date of Patent: Jul. 27, 2010

(54) PROCESS FOR THE PREPARATION OF POLYALKENYL ACYLATING AGENTS

(75) Inventors: Riccardo Rausa, San Donato Milanese (IT); Andrea Pucci, Pisa (IT); Luigi D'Elia, Pandino (IT); Francesco Ciardelli, Pisa (IT)

(73) Assignee: ENI S.p.A., Rome (IT)

( * ) Notice: Subject to any disclaimer, the term of this patent is extended or adjusted under 35 U.S.C. 154(b) by 172 days.

(21) Appl. No.: 11/776,228

(22) Filed: Jul. 11, 2007

(65) Prior Publication Data

US 2008/0027187 A1 Jan. 31, 2008

(30) Foreign Application Priority Data

Jul. 27, 2006 (IT) .......................... MI2006A1476

(51) Int. Cl.
*C08G 63/91* (2006.01)
(52) U.S. Cl. ....................... 525/245; 525/247; 525/301; 525/302; 525/308; 525/309; 525/310; 525/333.7; 525/370; 525/371
(58) Field of Classification Search ................. 525/301, 525/244, 245, 247, 333.7, 370, 386
See application file for complete search history.

(56) References Cited

U.S. PATENT DOCUMENTS

| 4,605,808 | A | | 8/1986 | Samson | |
|---|---|---|---|---|---|
| 5,420,207 | A | * | 5/1995 | Greif et al. .................. | 525/285 |
| 6,617,396 | B1 | * | 9/2003 | Harrison et al. ............. | 525/301 |
| 2004/0039125 | A1 | * | 2/2004 | Breuer et al. ................ | 525/242 |

FOREIGN PATENT DOCUMENTS

WO  WO 02/18454 A2  3/2002

OTHER PUBLICATIONS

Thompson et al., Terminal functionalization of polypropylene via the Alder Ene reaction, Polymer, vol. 39, issue 2, pp. 327-334, 1998.*
Thompson et al., A Parametric Study of the Terminal Maleation of Polypropylene through an Alder Ene Reaction, Journal of Polymer Science Part A: Polymer Chemistry, vol. 36, issue 13, pp. 2371-2380, 1998.*
Derwent Publications, AN 1980-04869C, XP-002417864, SU 660 979 A, May 5, 1979.

* cited by examiner

*Primary Examiner*—Vasu Jagannathan
*Assistant Examiner*—Robert C Boyle
(74) *Attorney, Agent, or Firm*—Oblon, Spivak, McClelland, Maier & Neustadt, L.L.P.

(57) ABSTRACT

Process for the preparation of polyalkenyl acylating agents which comprises:
  a. reacting at a temperature higher than 180° C. a reactive polyalkene, having a number average molecular weight Mn ranging from 500 to 5000 and having a content of terminal vinylidene groups greater than or equal to 30%, with an enophile;
  b. thermally carrying out the reaction for a time sufficient for having a conversion of the terminal vinylidene groups higher than 15%;
  c. completing the reaction always under heat in the presence of a reaction accelerator consisting of a Lewis acid selected from a tin, zinc, aluminum or titanium halide.

15 Claims, No Drawings

PROCESS FOR THE PREPARATION OF POLYALKENYL ACYLATING AGENTS

The present invention relates to a process for the preparation of polyalkenyl acylating agents.

More specifically, the present invention relates to a process for the preparation of oil-soluble polyalkenyl acylating agents by means of the reaction of a polyalkene having a high reactivity and an enophile.

Even more specifically the present invention relates to a process for the preparation of polyisobutylene succinanhydride. In the present description, all the operating conditions specified in the text are intended as being preferred conditions even if not expressly declared.

Polyalkenyl acylating agents are useful, as such, as additives for lubricating oils, as functional fluids or additives for fuels or they can be used as intermediates in the preparation of other products, for example polyalkenyl succino-imides, which substantially have analogous uses. Among these, the reaction product of succinic acids or anhydrides of polyisobutene with mono-amines or polyamines are widely used as ashless detergent/dispersant additives in lubricating oils and fuels.

Polyalkenyl acylating agents are generally prepared, by the direct thermal reaction of a polyalkene characterized by terminal double bonds of the vinylidene type and an enophile, at a temperature higher than 150° C., generally higher than 200° C. Examples of processes for the preparation of these polyalkenyl acylating agents are indicated in U.S. Pat. Nos. 4,086,251 and 4,152,499.

When carried out at relative low temperatures (around 200° C.), the preparation processes of the known art are, however, characterized by the drawback of having long reaction times, relatively low yields and low functionalization degrees.

The Applicants have now found a process for the preparation of polyalkenyl acylating agents capable of overcoming the drawbacks of the known art as described in the enclosed examples.

An object of the present invention therefore relates to a process for the preparation of polyalkenyl acylating agents which comprises:
a. reacting at a temperature higher than 180° C. a reactive polyalkene, having a number average molecular weight Mn ranging from 500 to 5000 and having a content of terminal vinylidene groups greater than or equal to 30%, with an enophile;
b. thermally carrying out the reaction for a time sufficient for having a conversion of the terminal vinylidene groups higher than 15%;
c. completing the reaction always under heat in the presence of a reaction accelerator consisting of a Lewis acid selected from a tin, zinc, aluminum or titanium halide having the formula $MX_y$, wherein M is the metal, X represents a halide such as chlorine, bromine or iodine, y varies from 2 to 4. The metallic halide can also comprise a number of crystallization water molecules ranging from 1 to 5.

According to the present invention, the reagent mixture is charged into the reactor in any convenient manner before heating to the reaction temperature. The reagents, for example, can be charged contemporaneously or sequentially in any order or premixed in a mixing container and then transferred to the reaction container. The reaction can be carried out in a solvent and in this case, the solvent is a mineral oil capable of dissolving the reagents and the reaction products which are recovered after bringing the reaction mixture, when the reaction has finished, to room temperature and subjecting it or not subjecting it to filtration.

Reactive polyalkenes differ from conventional polyalkenes in the content of terminal vinylidene groups. A polyalkylene chain having a terminal vinylidene group can be represented by the formula:

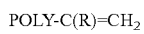

$$POLY-C(R)=CH_2$$

wherein R is an alkyl group, whose identity depends on the monomeric unit from which the polyalkene derives (for example R is a methyl group for polyisobutene) whereas POLY represents the rest of the polyalkenyl chain. Reactive polyalkenes are those having a content of terminal vinylidene groups equal to at least 30%, preferably at least 50%, more preferably ranging from 55 to 98%.

The polyalkenes according to the present invention are generally reactive homopolymers of α-olefins or copolymers of α-olefins such as, for example, ethylene-α-olefin copolymers. Preferred α-olefins according to the present invention are those, linear or branched, having the general formula $CH_2=CHR'$ wherein R' represents a linear or branched alkyl radical containing from 1 to 10 carbon atoms.

Preferred polyalkenes according to the present invention are reactive polyisobutene (PIB) and polybutene-1 with a content of terminal vinylidene groups preferably of at least 50%, for example from 50 to 99%, preferably from 60 to 95%. Methods for the preparation of reactive polyisobutene or polybutene-1 are described for example in U.S. Pat. Nos. 4,152,499, 4,605,808, 5,674,955 and in international patent application WO 01/19873.

Furthermore, the polyalkenes according to the present invention have a number average molecular weight Mn, measured, for example, by means of GPC (Gel Permeation Chromatography), osmometry, proton NMR or carbon-13 NMR, ranging from 500 to 5,000, for example from 700 to 4,000, preferably from 1,000 to 3,000. Particularly preferred are reactive polyisobutene and polybutene-1 having an average molecular weight Mn ranging from 1,000 to 2,500.

The term "enophile" as used in the present description and claims refers to products reaching with the polyalkenes mentioned above having an olefinic and carbonyl reactive group. Examples of "enophile" according to the present invention are fumaric acid, itaconic acid, maleic acid, acrylic acid, methacrylic acid, crotonic acid, cinnamic acid and the corresponding anhydrides or corresponding $C_1-C_4$ alkyl esters.

The preferred enophile is the anhydride of maleic acid which, when it is reacted with polyisobutene, allows the chemical intermediate polyisobutenyl succinanhydride (PIBSA) to be obtained. This intermediate can be reacted with a mono-amine or a polyamine, for example with diethylenetriamine (DETA), triethylenetetramine (TETA), tetraethylenepentamine (TEPA), hexaethyleneheptamine (HEPA), etc. to obtain the corresponding polyisobutylene succinoimide. This product is particularly useful as a dispersant for lubricating oils or as a detergent for fuels.

The reaction between the reactive polyalkene and enophile takes place at a temperature ranging from 180 to 300° C., preferably from 190 to 250° C. and even more preferably at about 200° C., at atmospheric pressure or under pressure in an inert gas, such as nitrogen, ranging from 0.1 to 1 MPa.

The reactive polyalkylene/enophile molar ratios generally range from 1:0.9 to 1:3. When the enophile is the anhydride of an unsaturated mono- or dicarboxylic acid, such as maleic acid, the reaction between the reactive polyalkene (A) and the enophile (B) takes place with B/A ratios in moles ranging from 0.9:1 to 3:1, preferably from 1.3:1 to 2.5:1, for example from 1.5:1 to 2.4:1.

The reaction accelerator is added to the reaction mixture when the conversion of the terminal vinylidene groups of the reactive polyalkene ranges from 15 to 90%, preferably from 30 to 80%. The accelerator is added to the reaction mixture in a quantity corresponding to a molar percentage concentration, referring to the reactive double bonds of polyalkene, e.g. PIB, ranging from 0.2 to 1.5%, preferably from 0.5 to 1.1%.

The reaction accelerator is preferably tin chloride $SnCl_2.2H_2O$.

The enclosed examples are provided for a better understanding of the present invention for illustrative and non-limiting purposes.

EXAMPLE 1

In a generic experiment, 100 g of PIB (Glissopal 1300 of BASF; Mn 1300) are charged into a 250 mL cylindrical glass reactor, equipped with a mechanical stirrer and reflux condenser.

The reactor is flushed with nitrogen, under stirring, until reaching a temperature of 110° C. After 30 minutes, 11.3 g of maleic anhydride (AM) are added and the mixture is heated to 200° C.

After completing at least 50% of the reaction, under stirring, $SnCl_2.2H_2O$ is added and the reaction is kept under stirring until 21 hours are reached. The temperature is then lowered to 160° C. and the non-reacted enophile is stripped under vacuum (0.2 mm Hg).

The weight conversion degree of the reaction was evaluated, by difference, by quantifying the weight of non-reacted polyisobutylene after its separation from the reaction mixture. A weighed quantity of polyisobutenyl succinanhydride (PIBSA), dissolved in n-heptane is eluted through a chromatographic column containing silica gel. The eluted phase, containing non-reacted PIB alone, is then evaporated, dried under vacuum (0.2 mmHg) and weighed.

The functionalization degree (GF), expressed as moles of succinic anhydride grafted per mole of reacted polymer, was determined by a method based on the procedure described in U.S. Pat. No. 4,952,328, after determining the acidity of the PIBSA, by titration according to what is described in the method ASTM D 664.

Tables 1-4 show the values and trends of the yields and GF of the products with time in the presence of and without a catalyst, from which a surprising positive effect can be observed of the Lewis acid in accelerating the conversion of the initial PIB and producing PIBSA with a higher functionalization degree.

TABLE 1

Effect of the catalyst and addition procedures on the final yield of the functionalization reaction of PIB 1300 at 200° C.

| PIB Mn | T (° C.) | Cat. (mol. %) | PIB/ MAH | React. Time (hours) | Yield (w %) |
|---|---|---|---|---|---|
| 1300 | 200 | 0.0 | 1/1.5 | 21 | 71.0 |
| 1300 | 200 | 0.5 (1) | 1/1.5 | 21 | 59.0 |
| 1300 | 200 | 0.5 (2) | 1/1.5 | 21 | 72.5 |

(1) Catalyst added at beginning of reaction;
(2) Catalyst added after partial conversion of PIB.

TABLE 2

Effect of the catalyst on the Functionalization Degree of PIBSA from PIB 1300 at the end of the reaction at 200° C.

| PIB Mn | T (° C.) | Cat. (mol. %) | PIB/ MAH | React. Time (hours) | GF |
|---|---|---|---|---|---|
| 1300 | 200 | 0.0 | 1/1.5 | 21 | 1.76 |
| 1300 | 200 | 0.5 (1) | 1/1.5 | 21 | 1.68 |
| 1300 | 200 | 0.5 (2) | 1/1.5 | 21 | 1.94 |

(1) Catalyst added at beginning of reaction;
(2) Catalyst added after partial conversion of PIB.

TABLE 3

Effect of the catalyst on the conversion kinetics of PIB 1300 at 200° C.

| PIB Mn | T (° C.) | Cat. (mol. %) | PIB/ MAH | React. Time (hours) | Yield (w %) |
|---|---|---|---|---|---|
| 1300 | 200 | 0 | 1/1.5 | 8 | 64.4 |
|  |  |  |  | 12 | 69.1 |
|  |  |  |  | 16 | 70.6 |
|  |  |  |  | 21 | 71.1 |
| 1300 | 200 | 0.5 | 1/1.5 | 10 | 71.7 |
|  |  |  |  | 12 | 71.3 |
|  |  |  |  | 16 | 72.8 |
|  |  |  |  | 21 | 72.5 |

TABLE 4

Effect of the catalyst on the Functionalization kinetics of PIB 1300 at 200° C.

| PIB | T (° C.) | Cat. (mol. %) | PIB/ MAH | React. Time (hours) | GF |
|---|---|---|---|---|---|
| 1300 | 200 | 0 | 1/1.5 | 12 | 1.68 |
|  |  |  |  | 16 | 1.73 |
|  |  |  |  | 21 | 1.76 |
| 1300 | 200 | 0.5 | 1/1.5 | 12 | 1.87 |
|  |  |  |  | 16 | 1.95 |
|  |  |  |  | 21 | 1.94 |

EXAMPLE 2

In another experiment, 100 g of PIB (Glissopal 1300 of BASF; Mn 1300) are charged into a 250 mL cylindrical glass reactor, equipped with a mechanical stirrer and reflux condenser.

The reactor is flushed with nitrogen, under stirring, until reaching a temperature of 110° C. After 30 minutes, 11.3 g of maleic anhydride (AM) are added and the mixture is heated to 220° C.

After completing at least 50% of the reaction, under stirring, $SnCl_2.2H_2O$ is added and the reaction is kept under stirring until 21 hours are reached. The temperature is then lowered to 160° C. and the non-reacted enophile is stripped under vacuum (0.2 mm Hg).

The effect of the catalyst on the yields and functionalization degree of the product is demonstrated by the results indicated in Tables 5 and 6.

TABLE 5

Effect of the catalyst on the yield of the functionalization reaction of PIB 1300 at 220° C.

| PIB Mn | T (° C.) | Cat. (mol. %) | PIB/MAH | React. Time (hours) | Yield (w %) |
|---|---|---|---|---|---|
| 1300 | 220 | 0.0 | 1/1.5 | 11 | 70.3 |
| 1300 | 220 | 0.5 | 1/1.5 | 11 | 72.1 |

TABLE 6

Effect of the catalyst on the Functionalization Degree of PIBSA obtained at 220° C.

| PIB Mn | T (° C.) | Cat. (mol. %) | PIB/MAH | React. Time (hours) | GF |
|---|---|---|---|---|---|
| 1300 | 220 | 0.0 | 1/1.5 | 11 | 1.79 |
| 1300 | 220 | 0.5 | 1/1.5 | 11 | 1.96 |

EXAMPLE 3

In a subsequent experiment, 510 g of PIB (Glissopal 2300 of BASF; Mn 2300) are charged into a 500 mL cylindrical glass reactor, equipped with a mechanical stirrer and reflux condenser.

The reactor is flushed with nitrogen, under stirring, until reaching a temperature of 130° C. 30.57 g of maleic anhydride (AM) are added and the mixture is heated to 200° C.

After completing at least 50% of the reaction, under stirring, $SnCl_2.2H_2O$ is added and the reaction is kept under stirring until 21 hours are reached. The temperature is then lowered to 160° C. and the non-reacted enophile is stripped under vacuum (0.2 mm Hg).

The effect of the catalyst on the yields and functionalization degree of the products is demonstrated by the results indicated in Table 7.

TABLE 7

Effect of the catalyst on the conversion and functionalization of PIBSA obtained starting from PIB 2300.

| PIB Mn | T (° C.) | Cat. (mol. %) | PIB/MAH | React. Time (hours) | Yield (w %) | GF |
|---|---|---|---|---|---|---|
| 2300 | 200 | 0 | 1/1.5 | 7 | 67.5 | 1.62 |
|  |  |  |  | 10 | 71.3 | 1.73 |
|  |  |  |  | 12 | 72.9 | 1.76 |
|  |  |  |  | 21 | 75.8 | 1.76 |
| 2300 | 200 | 0.5 | 1/1.5 | 7 | 69.7 | 1.65 |
|  |  |  |  | 10 | 72.8 | 1.92 |
|  |  |  |  | 12 | 74.3 | 1.84 |
|  |  |  |  | 21 | 77.1 | 2.05 |

The invention claimed is:

1. A process for the preparation of polyalkenyl acylating agents which comprises:
   a. thermally reacting at a temperature higher than 180° C. a reactive polyalkene having a number average molecular weight Mn ranging from 500 to 5,000 and having a content of terminal vinylidene groups greater than or equal to 30%, with an enophile, under conditions consisting essentially of a temperature ranging from 180° C. to 300° C. and atmospheric pressure or a pressure ranging from 0.1 to 1 MPa in an inert gas, for a time sufficient for conversion of the terminal vinylidene groups from 15 to 90% before adding a reaction accelerator to the reaction mixture;
   b. completing the reaction always under heat after adding a reaction accelerator consisting of a Lewis acid selected from a tin, zinc, aluminum or titanium halide having the formula $MX_y$, wherein M is the metal, X represents chlorine, bromine or iodine, and y is 2 to 4.

2. The process according to claim 1, wherein the reactive polyalkene is a reactive homopolymer of α-olefins or a copolymer of α-olefins.

3. The process according to claim 1 or 2, wherein the reactive polyalkene is selected from the group consisting of reactive polyisobutene and polybutene-1 having a content of terminal vinylidene groups of at least 50%.

4. The process according to claim 1, wherein the reactive polyalkene has a number average molecular weight Mn ranging from 700 to 4,000.

5. The process according to claim 4, wherein the reactive polyalkene is selected from the group consisting of reactive polyisobutene and polybutene-1 having a number average molecular weight Mn ranging from 1,000 to 2,500.

6. The process according to claim 1, wherein the enophile has an olefinic and at least one carbonyl reactive group.

7. The process according to claim 6, wherein the enophile is selected from the group consisting of fumaric acid, itaconic acid, maleic acid, acrylic acid, methacrylic acid, crotonic acid, cinnamic acid, their corresponding anhydrides and their corresponding $C_1$-$C_4$ alkyl esters.

8. The process according to claim 7, wherein the enophile is the anhydride of maleic acid.

9. The process according to claim 1, wherein the reaction between the reactive polyalkene and the enophile takes place at a temperature ranging from 180 to 300° C., at atmospheric pressure or under a pressure in an inert gas ranging from 0.1 to 1 MPa.

10. The process according to claim 1, wherein the reactive polyalkene/enophile molar ratios generally range from 1:0.9 to 1:3.

11. The process according to claim 1, wherein the reaction accelerator is added to the reaction mixture when the conversion of the terminal vinylidene groups of the reactive polyalkene ranges from 30 to 80%.

12. The process according to claim 1, wherein the accelerator is added to the reaction mixture in quantities corresponding to a molar percentage concentration, referring to the reactive double bonds, ranging from 0.2 to 1.5%.

13. The process according to claim 1, wherein the reaction accelerator is tin chloride $SnCl_2.2H_2O$.

14. The process according to claim 1, wherein the reactive polyalkene is selected from the group consisting of reactive polyisobutene and polybutene-1 having a content of terminal vinylidene groups from 50 to 99%.

15. The process according to claim 1, wherein the reactive polyalkene is selected from the group consisting of reactive polyisobutene and polybutene-1 having a content of terminal vinylidene groups from 60 to 95%.

* * * * *